Figure 1:
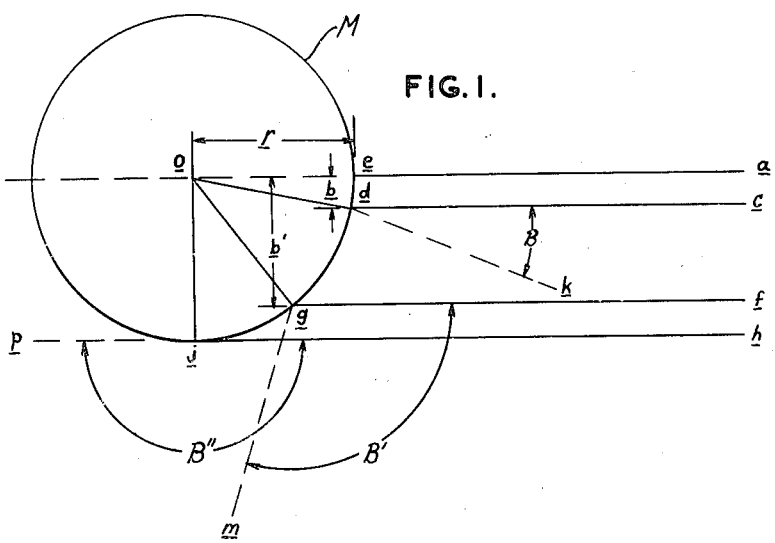

July 20, 1954

J. S. MALSBARY 2,684,009

OPTICAL INSPECTION DEVICE FOR TESTING
ACCURACY OF LOCATION OF AN OPENING

Filed March 19, 1951

2 Sheets-Sheet 1

INVENTOR.
JAMES S. MALSBARY
BY
ATTORNEYS

INVENTOR.
JAMES S. MALSBARY

Patented July 20, 1954

2,684,009

UNITED STATES PATENT OFFICE

2,684,009

OPTICAL INSPECTION DEVICE FOR TESTING ACCURACY OF LOCATION OF AN OPENING

James S. Malsbary, Glendale, Mo., assignor to Wagner Electric Corporation, St. Louis, Mo., a corporation of Delaware Application March 19, 1951, Serial No. 216,330

7 Claims. (Cl. 88—14)

This invention relates in general to optical inspection devices and more particularly to certain new and useful improvements in devices for optical inspection and verification of the location of apertures, such as drilled holes, in manufactured parts.

The primary object of the invention is to provide an optical inspection system for verifying, within predetermined limits of tolerance, the location of bores, jets, and other orifices and apertures in manufactured parts made of opaque materials.

An additional object of the invention is to provide an optical inspection device which is adapted for usage under conditions of quantity production, and does not require the services of skilled operators.

Another object of the invention is to interpose the part to be inspected within converging light rays and to measure the field of the rays penetrating the aperture in said part.

A further object of the invention is to provide an optical inspection device which utilizes a curved mirror to amplify deviations in aperture location and photo-electric gauging to determine whether such deviations exceed permissible limits.

With the above and other objects in view the present invention resides in the novel features of form, construction, arrangement, and combination of parts hereinafter described and pointed out in the claims.

Figure 2:
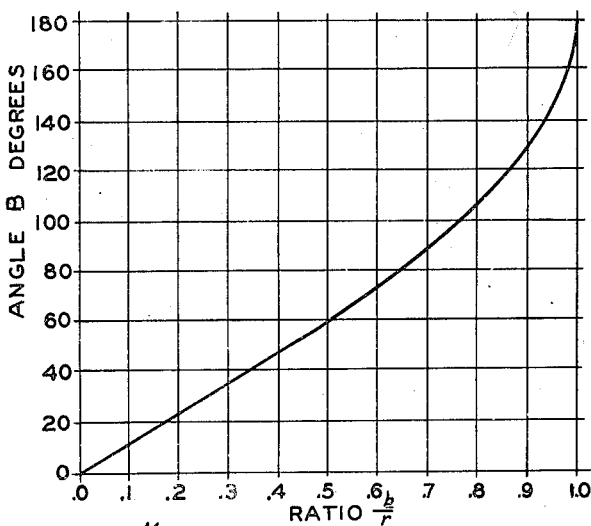
Figure 3:
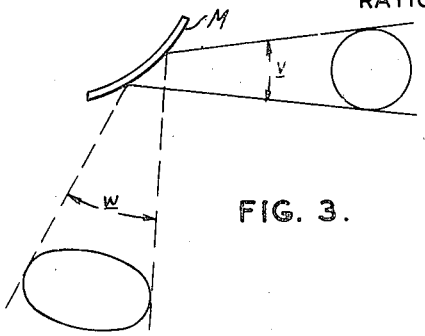
Figure 4:
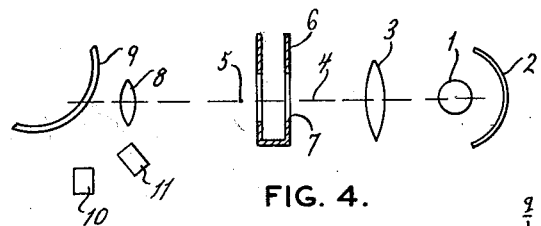
Figure 5:
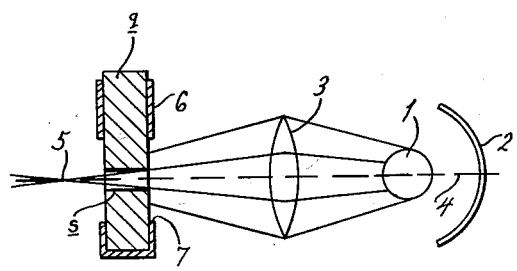
Figure 6:
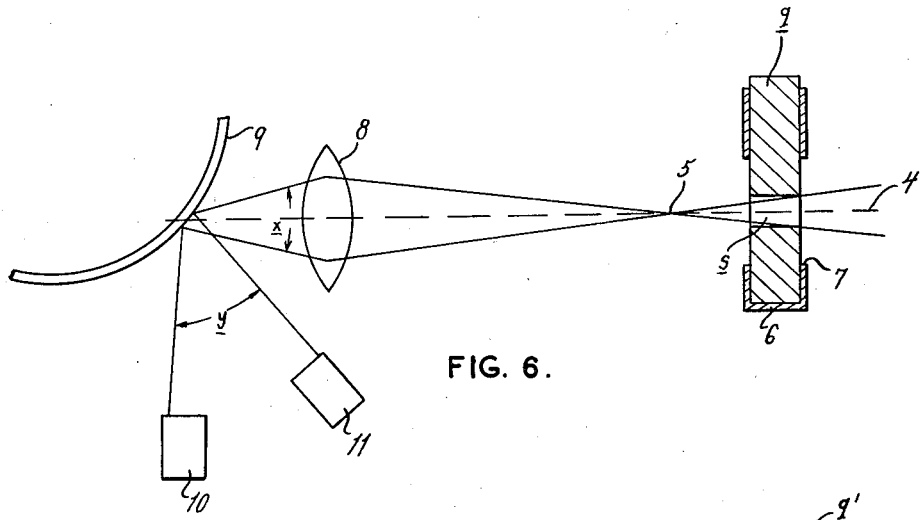
Figure 7:
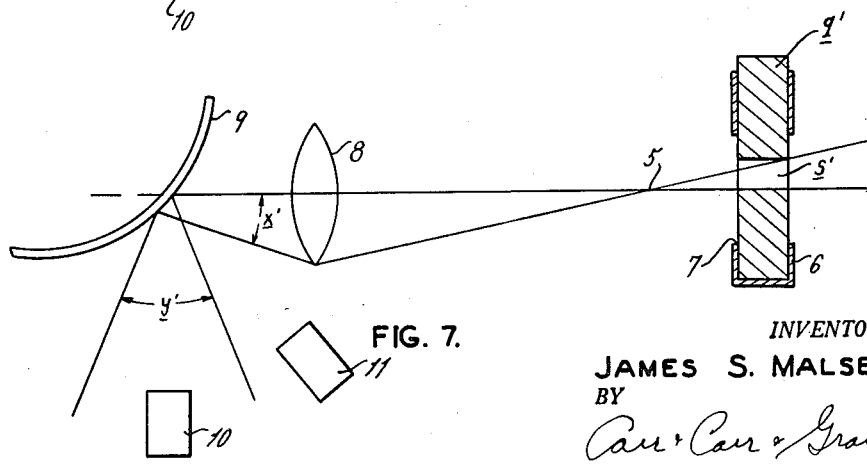

In the drawings:

Fig. 1 is a geometric presentation showing the variation of angle of reflection of a ray of light with movement of its point of impingement on a convex mirror of cylindrical curvature, Fig. 2 is a graphical presentation showing the relation of the reflected angle to the point of impingement on such a mirror, Fig. 3 is a diagrammatic presentation of a reflection of a bundle of converging light rays from such a mirror, Fig. 4 is a schematic view of an optical device constructed in accordance with and embodying the present invention, Fig. 5 is a schematic view of a portion of such optical device illustrating the screening off, by the object being inspected, of a portion of the light rays employed for inspection, Fig. 6 is a schematic view of a portion of such optical device illustrating its operation during the inspection of a correctly located aperture; and Fig. 7 is a schematic view of a portion of such optical device illustrating its operation during the inspection of an incorrectly located aperture.

Referring now by reference characters to Figure 1, M represents a cylindrical mirrored surface having its center at $o$ and a radius $r$. The parallel light rays $ae$, $cd$, $fg$, and $hj$, impinge on its mirrored surface at points $e$, $d$, $g$, $j$, respectively. The ray $ae$ is normal to the mirrored surface M; the rays $cd$ and $fg$ are spaced from the ray $ae$ at distances marked $b$ and $b'$, respectively, both being less than the radius $r$, while the ray $hj$ is spaced from $ae$ a distance equal to $r$ and is, therefore, tangential to the mirror M at point $j$.

In order to plot the reflections of these rays, the radii $oe$, $od$, $og$, $oj$ are constructed. It is then apparent that the reflection of ray $cd$ will be $dk$, which forms an angle B with its incident ray $cd$. The reflected ray $gm$ forms an angle B' with its incident ray $fg$. Comparing the two angles B and B', it is noticed that they vary as a function of their distance from the normally impinging ray $ae$, whose reflection coincides with it. At the extreme, the reflection of the tangential ray $hj$ is $jp$, at an angle B'' which amounts to 180°.

In Fig. 2 the variation of the angle B (made by the reflected ray with the incident ray) is plotted with respect to the non-dimensional quantity $b/r$. At ratios of $b/r$ in excess of 0.7, the angularity of the reflected ray with the incident ray increases markedly. Hence, if a light image can be focused on a curved mirror with its axis displaced from the center of curvature, particularly if disposed a distance corresponding to a ratio of $b/r=0.7$ or more, any movement of the image in the plane of curvature of the mirror will result in a marked shift of the light reflected therefrom. This principle of optical amplification is utilized in the working of the present invention.

In dealing with a bundle of rays of light, rather than the single rays shown in Fig. 1, the use of a mirror of cylindrical curvature results in a spreading of the reflected rays, illustrated in Fig. 3. Thus a bundle of rays having circular cross-section and converging at an angle designated $v$ will be reflected as a bundle having an elliptical cross-section and diverging at an angle greater than $v$ and designated $w$. The difference between the angles $v$ and $w$ will obviously be a function of the displacement of the optical axes from the center of curvature of the mirror M, that is, of the ratio $b/r$.

Referring now to Fig. 4, there is schematically presented an optical system having a lamp I and a concaved mirrored reflector 2 associated therewith. The light rays from the lamp 1 progress through a first converging lens 3 having an optical axis designated 4 and a focal point along said axis designated 5. Positioned adjacent said focal point 5 and between it and the first converging lens 3 is a work-receiving inspection frame 6 having a large central opening 7 to permit the passage of the light rays therethrough. In alignment with the optical axis 5 is a second lens 8 adapted to focus on a convex first surface mirror 9 which has a relatively small radius of curvature and is presented obliquely for reflection of the light focused thereon to one side thereof.

Two photo-electric cells 10, 11 are positioned a predetermined distance from the mirror 9 and are adjustable with respect to each other so as to respond to, and be actuated by, light reflected therefrom. The mode of spacing the photo-electric cells 10, 11 will become clear from the description which follows. Alignment of the lamp, 1, the reflector 2, the lenses 3, 8, and the mirror 9 is fixed.

In Figs. 5 and 6 a correctly manufactured part $q$ made of opaque material and having an accurately located drilled bore $s$, is shown inserted in the inspection frame 6, which frame is adjustably secured in aligned position with the axis 4. The interposition of the part $q$ within the rays from lamp 1 and reflector 2, screens off a major portion of the rays passing through the lens 3, as shown in Fig. 5. Inasmuch as the rays from lamp 1 have been caused to converge by the lens 3, the surface of part $q$ nearest the lens effects the screening, and reflection of light from the wall of the bore $s$ is avoided. If the focal point were within the bore $b$, or forward of it (i. e., nearer the lens 3) there would be a substantial reflection of light off the wall of the bore $s$, interfering with the operation of the device. It would be satisfactory that the focal point 5 correspond with the position of the rear wall of the part $q$, but it is most feasible to so adjust the inspection frame 6 that the focal point 5 falls slightly aft of such rear wall.

An image of a portion of the light source (the lamp 1 and reflector 2) is thus caused to be focused on the curved mirror 9. Utilizing the rays reflected therefrom, the position of such image is gauged by the photocells 10, 11, in the manner hereinafter described.

Corresponding to Fig. 3, the angle made by the outer rays converging on the mirror 9 in Fig. 6 is designated $x$ and the angle made by the outer rays reflected therefrom is designated $y$. The spacing of the photoelectric cells 10, 11, is so adjusted with reference to the margins of the angle $y$ as to gauge it. In Fig. 6 the photo-cells 10, 11, are shown as having their fields within the angle $y$, so that on the inspection of a correctly drilled part, such as $q$, both of the cells 10, 11, will be activated to a predetermined signal strength. It is apparent that the cells 10, 11 could instead be placed just outside the margins of $y$ so that on the inspection of part $q$ neither cell would be activated.

Any mislocation of the bore of any similar part, either above or below the optical axis, beyond a selected tolerance, will result in such movement in the position of the image focused on mirror 9 as to substantially displace the field of the reflected rays, conformable with the principles of Figs. 1 and 2. This movement will result in failure to activate one of said photo-electric cells 10, 11. Referring to Fig. 7, there is illustrated the inspection of an incorrectly drilled manufactured part $q'$ the axis of whose bore $s'$ does not coincide with the optical axis 4. The light rays not screened out by the part $q'$ converge to form an image on the mirror 9 displaced from the position of the image shown in Fig. 6. This displacement is so amplified by the sideward reflection off the curved mirror 9 that the field of the reflected rays, covering an angle designated $y'$, is greatly different in position, and somewhat different in magnitude, from the angle $y$ of the reflected rays attendant inspection of the correctly located bore $s$ in Fig. 6. The result is that only one of the two photo-cells 10, 11 will be activated to the predetermined signal strength, if at all.

Thus, a relatively small difference in position of the rays converging on the mirror 9, occupying an angle designated $x$ in Fig. 6 and $x'$ in Fig. 7, is magnified so greatly as to make feasible an optical determination of conformity with or departure from a selected standard.

For use on production lines and with relatively unskilled help, it is preferable that there be no reliance upon taking readings from photo-electric cells. In the system illustrated, deviations in aperture location result in such large changes in field of the reflected rays that the inspection process is a mere matter of determining whether both of the photo-cells 10, 11 register. In large quantity production, it is most convenient to connect photo-cells by suitable relays in a circuit which includes an automatic rejection or system-signalling device, so that unless a circuit is made by the response of both photo-cells, the part inspected will be rejected. Such electrical circuits are well known in the art.

Minor aberrations in the optical system, such as those attending the use of a non-monochromatic light source, do not substantially interfere with its operation.

The form of device illustrated and described is but one of several obvious embodiments of the essential operating principles of the present invention. This form is of particular value in instances where the error in bore location is likely to be linear, that is, along a known line. Such a case is subject to easy two-dimensional illustration. Where there is no such linear pattern of error, it is apparent that a mirror of spherical curvature might be employed in connection with as many as four gauging photo-cells. In other applications, the use of a single photo-cell may suffice. A simple polished cylinder, whose radius is somewhat greater than the diameter of the focused image of the bore to be inspected, may serve as a mirror.

Other physical modifications of the optical system employed will come to mind, such as the insertion of prisms to bend the light rays as to permit inspection of apertures in tube walls, and other partly closed members. Such a modification has been successfully employed utilizing a cylindrical mirror having a radius of curvature of $1/4''$, in the inspection of the precise position of an orifice within the wall of a tubular casting, the orifice having a diameter of the order of magnitude of $0.025''$.

It should, therefore, be understood that changes and modifications in the form, construction, arrangement, and combination of the several parts of the optical inspection system may be made and substituted for those herein shown

What I claim is:

1. An optical inspection device for testing the accuracy of the location of an opening in a specimen, comprising a source of converging light having an optical axis, specimen positioning means on the optical axis for so positioning the specimen that the optical axis passes through the opening therein, a focusing lens on the optical axis at the side of said means remote from said source of light for transmitting the light passing through the opening, a substantially cylindrical mirror the center of curvature of which is offset from the optical axis so that substantially all of the light passing through the opening reflects from the cylindrical mirror to one side of the optical axis over a broadened angular field, and light sensitive means predeterminately spaced relative to the mirror depending upon the size and location of the opening so that a properly positioned opening transmits light to the mirror for reflection according to a predetermined pattern whereby the light sensitive means indicates the correctness or incorrectness of the positioning of the opening in the specimen.

2. An optical inspection device for testing the accuracy of the location of an opening in a specimen, comprising a source of converging light having an optical axis, an inspection frame having an opening therethrough at least the size of the specimen opening aligned with the optical axis, a focusing lens on the optical axis at the side of said frame remote from said source of light for transmitting the light passing through the opening, a convex mirror of substantially cylindrical form in the path of the transmitted light with its center of curvature offset with respect to the optical axis to reflect the transmitted light to one side of the optical axis, and light sensitive means on said one side of the optical axis and predeterminately spaced relative to the mirror depending upon the size and location of the opening so that a properly positioned opening transmits light to the mirror for reflection according to a predetermined pattern whereby the light sensitive means indicates the correctness or incorrectness of the positioning of the opening in the specimen.

3. An optical inspection device for testing the accuracy of the location of an opening in a specimen, comprising a source of converging light having on optical axis, an inspection frame having an opening therethrough at least the size of the specimen opening aligned with the optical axis, a focusing lens on the optical axis at the side of said frame remote from said source of light for transmitting the light passing through the opening, a convex mirror of substantially cylindrical form in the path of the transmitted light with its center of curvature offset with respect to the optical axis to reflect the transmitted light to one side of the optical axis, and a plurality of light sensitive devices positioned so as to define boundary portions of the reflected light for a properly positioned opening whereby light passing through a properly positioned opening actuates all of said devices.

4. An optical inspection device for testing the accuracy of the location of an opening in a specimen, comprising a source of converging light having an optical axis, an inspection frame having an opening therethrough at least the size of the specimen opening aligned with the optical axis, a focusing lens on the optical axis at the side of said frame remote from said source of light for transmitting the light passing through the opening, a convex mirror of substantially cylindrical form in the path of the transmitted light with its center of curvature offset with respect to the optical axis to reflect the transmitted light to one side of the optical axis, and a pair of photoelectric cells positioned so as to define boundary portions of the reflected light for a properly positioned opening whereby light passing through a properly positioned opening activates both of said cells.

5. An optical inspection device for testing the accuracy of the location of an opening in a specimen, comprising a source of converging light having an optical axis, specimen positioning means on the optical axis for so positioning the specimen that the optical axis passes through the opening therein, said specimen positioning means being located between the source of converging light and its focal point, a focusing lens on the optical axis at the side of said means remote from said source of light for transmitting the light passing through the opening, a substantially cylindrical mirror the center of curvature of which is offset from the optical axis so that substantially all of the light passing through the opening reflects from the cylindrical mirror to one side of the optical axis over a broadened angular field, and light sensitive means predeterminately spaced relative to the mirror depending upon the size and location of the opening so that a properly positioned opening transmits light to the mirror for reflection according to a predetermined pattern whereby the light sensitive means indicates the correctness or incorrectness of the positioning of the opening in the specimen.

6. An optical inspection device for testing the accuracy of the location of an opening in a specimen, comprising a source of converging light having an optical axis, an inspection frame having an opening therethrough at least the size of the specimen opening aligned with the optical axis, said inspection frame being located between the source of converging light and its focal point, a focusing lens on the optical axis at the side of said frame remote from said source of light for transmitting the light passing through the opening, a convex mirror of substantially cylindrical form in the path of the transmitted light with its center of curvature offset with respect to the optical axis to reflect the transmitted light to one side of the optical axis, and light sensitive means on said one side of the optical axis and predeterminately spaced relative to the mirror depending upon the size and location of the opening so that a properly positioned opening transmits light to the mirror for reflection according to a predetermined pattern whereby the light sensitive means indicates the correctness or incorrectness of the positioning of the opening in the specimen.

7. An optical inspection device for testing the accuracy of the location of an opening in a specimen, comprising a source of converging light having an optical axis, specimen positioning means on the optical axis for so positioning the specimen that the optical axis passes through the opening therein, a focusing lens on the optical axis at the side of said means remote from said source of light for transmitting the light passing through the opening, a substantially cylindrical mirror having a radius of curvature greater than the size of the image focused thereon and the center of curvature of which is offset from the optical axis so that substantially all of the light passing through the opening reflects from the cylindrical mirror to one side of the optical axis over a broadened angular field, and light sensitive means predeterminately spaced relative to the mirror depending upon the size and location of the opening so that a properly positioned opening transmits light to the mirror for reflection according to a predetermined pattern whereby the light sensitive means indicates the correctness or incorrectness of the positioning of the opening in the specimen.

References Cited in the file of this patent

UNITED STATES PATENTS

| Number | Name | Date |
|---|---|---|
| 2,085,671 | Powers | June 29, 1937 |
| 2,415,176 | Hurley | Feb. 4, 1947 |
| 2,433,559 | Gieseke | Dec. 30, 1947 |